United States Patent
Harel et al.

(10) Patent No.: US 7,032,135 B2
(45) Date of Patent: Apr. 18, 2006

(54) EQUIPMENT PROTECTION USING A PARTIAL STAR ARCHITECTURE

(75) Inventors: Rafi Harel, Beit Hashmonai (IL); Leon Bruckman, Petah Tikva (IL); Gal Mor, Herzlia (IL)

(73) Assignee: Corrigent Systems Ltd., Tel Aviv (IL)

( * ) Notice: Subject to any disclaimer, the term of this patent is extended or adjusted under 35 U.S.C. 154(b) by 558 days.

(21) Appl. No.: 10/211,065

(22) Filed: Aug. 2, 2002

(65) Prior Publication Data

US 2004/0078620 A1 Apr. 22, 2004

(51) Int. Cl.
*G06F 11/00* (2006.01)

(52) U.S. Cl. .............................. 714/43; 714/4; 398/61; 370/425; 709/252

(58) Field of Classification Search .................. 398/63, 398/61, 43, 4; 714/43, 4, 63, 61; 370/425, 370/419; 709/252
See application file for complete search history.

(56) References Cited

U.S. PATENT DOCUMENTS

| 5,159,595 | A | | 10/1992 | Flanagan et al. |
| 5,307,353 | A | | 4/1994 | Yamashita et al. |
| 5,321,393 | A | * | 6/1994 | Carlton et al. ......... 340/825.01 |
| 5,596,569 | A | * | 1/1997 | Madonna et al. ........... 370/217 |
| 5,638,358 | A | * | 6/1997 | Hagi ........................... 370/228 |
| 5,925,137 | A | | 7/1999 | Okanoue et al. |
| 6,233,073 | B1 | | 5/2001 | Bowers et al. |
| 6,246,667 | B1 | | 6/2001 | Ballantine et al. |
| 6,359,858 | B1 | * | 3/2002 | Smith et al. ................. 370/217 |
| 6,366,556 | B1 | | 4/2002 | Ballintine et al. |
| 6,456,587 | B1 | | 9/2002 | Taniguchi |
| 6,636,478 | B1 | * | 10/2003 | Sensel et al. ............... 370/216 |
| 6,680,906 | B1 | | 1/2004 | Nguyen |
| 6,724,880 | B1 | * | 4/2004 | Lynch ......................... 379/219 |
| 6,879,559 | B1 | * | 4/2005 | Blackmon et al. .......... 370/225 |
| 2002/0179720 | A1 | * | 12/2002 | Liva et al. .................. 235/492 |
| 2003/0088698 | A1 | | 5/2003 | Singh et al. |
| 2003/0147344 | A1 | | 8/2003 | Stewart et al. |
| 2003/0196135 | A1 | * | 10/2003 | Gottlieb ....................... 714/13 |

OTHER PUBLICATIONS

Cisco ONS 15454, available at: http://www.cisco.com/warp/public/cc/pd/olpl/metro/on15454/prodlit/wldvs_ds.htm, May 2002.
"Star Network""Star Topology""Mesh Network", Microsoft Computer Dictionary (Fifth Edition), 2002, Microsoft Press.
Null, Linda, The Essentials of Computer Organization and Architecture 2003, Jones and Barlett Computer Science, p. 536.

* cited by examiner

*Primary Examiner*—Robert Beausoliel
*Assistant Examiner*—Christopher McCarthy
(74) *Attorney, Agent, or Firm*—Darby & Darby (57) ABSTRACT

Communication apparatus includes a plurality of interface cards, including a central interface card and spoke interface cards, which are adapted to link communication lines to a network. A protection bus includes multiple spoke connections that link the central interface card to the spoke interface cards in a partial star configuration, such that on at least one of the spoke connections there are two of the spoke interface cards connected together to the central interface card.

17 Claims, 6 Drawing Sheets

EQUIPMENT PROTECTION USING A PARTIAL STAR ARCHITECTURE

FIELD OF THE INVENTION

The present invention relates generally to communication systems, and specifically to protecting communication systems against equipment failures.

BACKGROUND OF THE INVENTION

Equipment protection—providing reliable backup service in the case of failure—is an essential part of most high-speed telecommunication systems. Telecommunication equipment typically includes some redundant components, which automatically take over for faulty components when failure occurs. Common protection schemes include 1:1 and 1:N systems. In a 1:1 system, each working communication interface has a dedicated backup interface, also referred to as a protection interface, which remains on standby as long as the working interface is functioning properly. In a 1:N system, a single backup interface serves N working interfaces. The choice of N depends on a tradeoff between cost and reliability demands.

Backplane-based configurations are commonly used in communication and computing equipment. In network access systems, for example, a backplane may be used to connect a main module, having a trunk link to a core network, to a number of subsidiary modules having ports such as DS-3 interfaces, which serve network users (The DS-3 level of the plesiochronous digital hierarchy [PDH] is used in circuit-switched communication networks to carry medium-speed traffic at 44.736 Mbps.) The main and subsidiary modules comprise interface cards, also referred to as line cards, with plug into suitable receptacles, typically edge connectors, on the backplane. Printed circuit traces on the backplane connect the subsidiary modules to the ports of the main module, as well as passing different types of signals (such as data and clock signals) between the line cards located in the same chassis.

Equipment protection in such backplane-based systems typically requires that redundant interface cards be installed in the chassis (also referred to as a shelf). Data signals are conveyed between the redundant cards and the working interface cards using either a box external to the chassis or a protection bus inside the chassis. To avoid awkward and potentially unreliable cabling, the protection bus is best implemented using traces on the backplane. The choice of whether to use 1:1 or 1:N protection is usually made by the network operator based on the cost and reliability constraints of the particular application environment. These constraints may change over time, or when existing equipment is redeployed in a new location or application.

In response to the need for flexible protection configuration, some systems offer the network operator the possibility of configuring the equipment in either a 1:1 or 1:N protection topology. Typically, separate traces are provided on the backplane for the 1:1 and 1:N protection buses, meaning that additional printed circuit traces must be introduced on a board that is already crowded with conductors carrying high-speed signals. Each edge connector on the backplane must also have additional pins to accommodate the different protection buses, and a relay or other switch must be added for selecting the protection mode to be used. It can thus be appreciated that this implementation approach has a number of disadvantages in terms of equipment cost and complexity.

SUMMARY OF THE INVENTION

It is an object of some aspects of the present invention to reduce the hardware burden and complexity associated with providing flexible protection configuration, particularly in backplane-based equipment.

In preferred embodiments of the present invention, communication equipment comprises a plurality of interface cards, interconnected by a protection bus having a partial star topology. In this topology, one of the interface cards, referred to as the central interface card, is connected at the hub of the star, while the remaining cards are connected to the spokes, with two of the interface cards connected together on each of one or more of the spokes. Each of the interface cards comprises one or more switches for selecting the protection configuration of the equipment. For 1:N configuration, the switches are set so that the central interface card serves as the protection card for all the other interface cards in the partial star. For 1:1 configuration, the switches are set so that the two interface cards connected together on each spoke operate as a 1:1 protection pair (possibly except for one of the spoke interface cards that is paired with the central interface card).

Thus, the single partial-star protection bus is configurable for both 1:1 and 1:N protection, with the same spokes of the bus serving both configurations. In backplane-based systems, the use of such a bus reduces the number of traces required on the backplane and the number of pins required in each edge connector. It also reduces the number of interfaces that the central interface card must have in order to provide 1:N protection, since some of the spokes (typically all the spokes, or all but one of the spokes) are used to link two interface cards to the central interface card. Although the preferred embodiments described herein are directed to backplane-based systems that are configurable for 1:1 and 1:N protection, the partial star architecture may also be used in other flexible protection schemes.

There is therefore provided, in accordance with a preferred embodiment of the present invention, communication apparatus, including:

a plurality of interface cards, including a central interface card and spoke interface cards, which are adapted to link communication lines to a network; and a protection bus including multiple spoke connections that link the central interface card to the spoke interface cards in a partial star configuration, such that on at least one of the spoke connections there are two of the spoke interface cards connected together to the central interface card.

Preferably, no more than a single one of the spoke connections has only one of the spoke interface cards connected thereto, while the remaining spoke connections have respective pairs of the spoke interface cards connected thereto. Further preferably, each of the pairs of the spoke interface cards includes a working card and a protection card, which are adapted to operate in a 1:1 protection configuration. Most preferably, the working card includes a connection interface, which is connected to receive and transmit signals over one of the communication lines, and an input switch, which is operable so as to transfer the signals via one of the spoke connections to the protection card when a fault occurs in the working card. In addition both the working card and the protection card preferably include processing circuitry, for processing the signals, and the protection card includes an output switch, which is operable so as to receive the signals from the one of the spoke connections when the fault occurs in the working card and to convey the signals to the processing circuitry of the protection card for processing thereby.

In a preferred embodiment, the central interface card is adapted to operate in the 1:1 protection configuration in conjunction with the one of the spoke interface cards that is connected to the single one of the spoke connections having only the one of the spoke interface cards connected thereto.

Preferably, the spoke interface cards are adapted to serve as working cards, including respective connection interfaces, which are connected to receive and transmit signals over the communication lines, and the central interface card is adapted to serve as a protection card for the working cards in a 1:N protection configuration. Further preferably, each of the spoke interface card includes an input switch, which is operable so as to transfer the signals via one of the spoke connections to the central interface card when a fault occurs in the spoke interface card. Most preferably, both the spoke interface card and the central interface card include processing circuitry, for processing the signals, and for each one of the spoke connections, the central interface card includes a respective output switch, which is operable so as to receive the signals from the one of the spoke connections when the fault occurs in the spoke interface card and to convey the signals to the processing circuitry of the central interface card for processing thereby.

There is also provided, in accordance with a preferred embodiment of the present invention, a communication backplane, including:

a backplane substrate;

a plurality of receptacles fixed to the backplane substrate for receiving communication interface cards, the receptacles including a central receptacle and spoke receptacles; and printed circuit traces arranged on the backplane substrate to form a protection bus that includes multiple spoke connections linking the central receptacle to the spoke receptacles in a partial star configuration, such that on at least one of the spoke connections there are two of the spoke receptacles connected together to the central receptacle.

Preferably, no more than a single one of the spoke connections has only one of the spoke receptacles connected thereto, while the remaining spoke connections have respective pairs of the spoke receptacles connected thereto.

There is additionally provided, in accordance with a preferred embodiment of the present invention, a method for fault protection in communication equipment, including:

arranging a plurality of interface cards, including a central interface card and spoke interface cards, to link communication lines to a network;

interconnecting the interface cards with a protection bus including multiple spoke connections that link the central interface card to the spoke interface cards in a partial star configuration, such that on at least one of the spoke connections there are two of the spoke interface cards connected together to the central interface card;

determining that a fault has occurred in a first one of the interface cards serving a first one of the communication lines; and responsive to the fault, conveying signals over the protection bus from the first one of the interface cards to a second one of the interface cards, so that the second one of the interface cards serves the first one of the communication lines in place of the first one of the interface cards.

The present invention will be more fully understood from the following detailed description of the preferred embodiments thereof, taken together with the drawings in which:

DETAILED DESCRIPTION OF PREFERRED EMBODIMENTS

Figure 1:
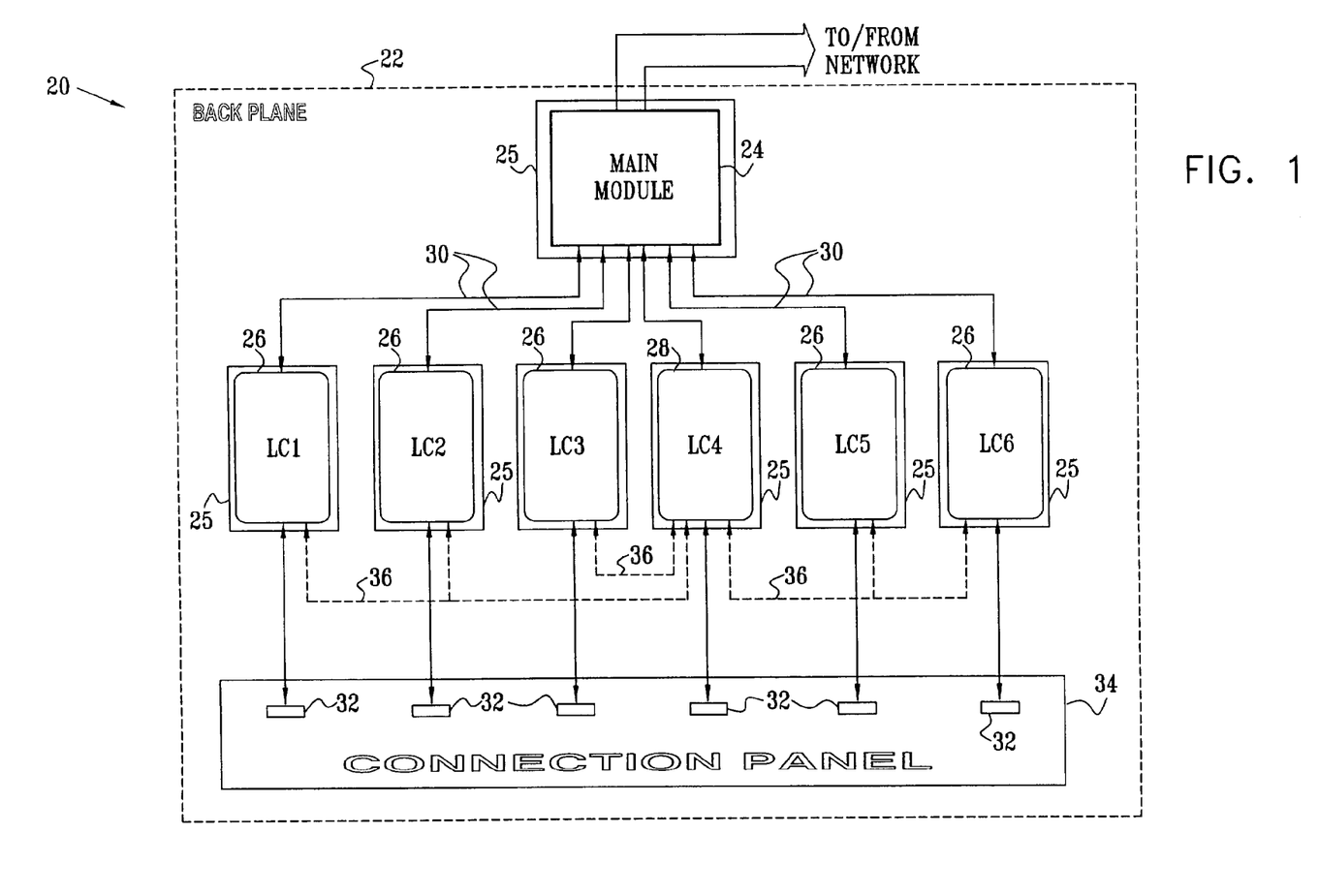
FIG. 1 is a block diagram that schematically illustrates communication equipment with a partial-star protection bus, in accordance with a preferred embodiment of the present invention.

FIG. 1 is a block diagram that schematically illustrates communication equipment 20, in accordance with a preferred embodiment of the present invention. Equipment 20 comprises a backplane 22, to which multiple interface cards are connected. The interface cards include a main module 24 and six subsidiary modules 26, 28, also referred to hereinafter as line cards (labeled LC1 through LC6). The main and subsidiary modules plug into receptacles 25, typically edge connectors, or slots, on backplane 22. The backplane comprises a printed circuit substrate, with printed circuit traces 30 formed thereon so as to interconnect receptacles 25. Although in this embodiment, equipment 20 comprises six subsidiary modules, greater or smaller numbers of modules may similarly be used.

Main module 24 typically comprises a network interface, which connects equipment 20 to a core network, along with a switch (not shown) for multiplexing among the subsidiary modules. Each of subsidiary modules 26, 28 has a user line interface that is coupled to a respective connector 32 on a connection panel 34. The user line interfaces may comprise substantially any suitable types of interfaces known in the art. For example, the user line interfaces may comprise DS3 interfaces. In this case, a respective DS3 user line can then be connected to each of connectors 32, enabling incoming signals from the user line to be transmitted onto the core network, and outgoing signals from the network to be conveyed to the user line.

Subsidiary modules 26, 28 comprise five spoke line cards 26 and one central line card 28, which are mutually linked by a protection bus 36. The protection bus has a partial star topology, meaning that there are multiple spoke line cards connected to each of one or more of the spokes of the star. Because equipment 20 is designed to support 1:N and 1:1 protection configurations, each spoke has either one or two spoke cards connected thereto. In the present embodiment, LC1 and LC2 are together connected to one spoke, while LC5 and LC6 are connected to another. LC3 is connected by its own spoke to the central card LC4. The number of spokes is thus equal to ceil(N/2), i.e., the smallest integer that is no less than N/2—three spokes in the present example. In the 1:N configuration (in this case, N=5), LC4 may serve as the protection card for all of spoke cards 26 or for a subset of the spoke cards. In the 1:1 configuration, there are three 1:1 protection pairs: LC1–LC2, LC3–LC4 and LC5–LC6. Bus 36, which preferably comprises a set of traces on backplane 22, serves both the 1:N and 1:1 configurations. The same traces are used for both configurations, depending on the setting of switches on the line cards, as described hereinbelow.

Figure 2:
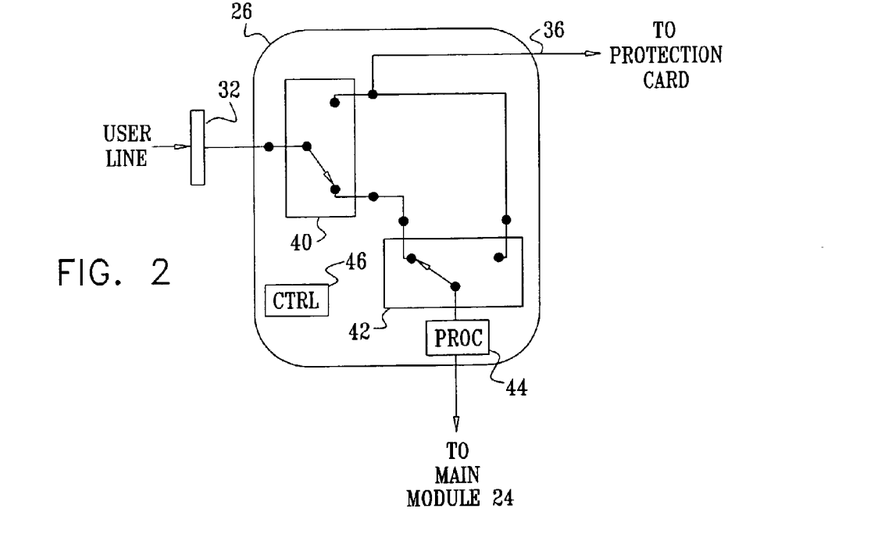
FIG. 2 is a block diagram that schematically illustrates an interface card for use in the equipment of FIG. 1, in accordance with a preferred embodiment of the present invention.

FIG. 2 is a block diagram that schematically illustrates one of spoke line cards 26, in accordance with a preferred embodiment of the present invention. The spoke line card receives and processes incoming signals from its respective user line via connector 32 and conveys the processed signals to main module 24. In the normal working configuration shown here, an input switch 40 connects the user line to an output switch 42, which in turn connects to signal processing circuitry 44. Circuitry 44 processes the incoming user line signals, as is known in the art, following which the processed signals are conveyed through traces 30 to main module 24. An embedded controller 46 controls the settings of switches 40 and 42, depending on whether card 26 is in its normal working mode or protection mode. The design and implementation of processing circuitry 44 and controller 46 are straightforward, and various possible designs will be apparent to those skilled in the art. Theses elements are omitted from subsequent figures for the sake of simplicity.

Outgoing signals from main module 24 are similarly conveyed via traces 30 to circuitry 44 on line card 26. In the normal working configuration, the outgoing signals are switched to connector 32 in the same manner as are the incoming signals shown in FIG. 2. The additional lines and switch contacts required for this purpose on card 26 are omitted from the figures for the sake of simplicity. Generally speaking, the switching and circuitry required for both normal operation and protection of line cards 26 and 28 in processing outgoing signals is simply the mirror image of that required for incoming signals.

Figure 3:
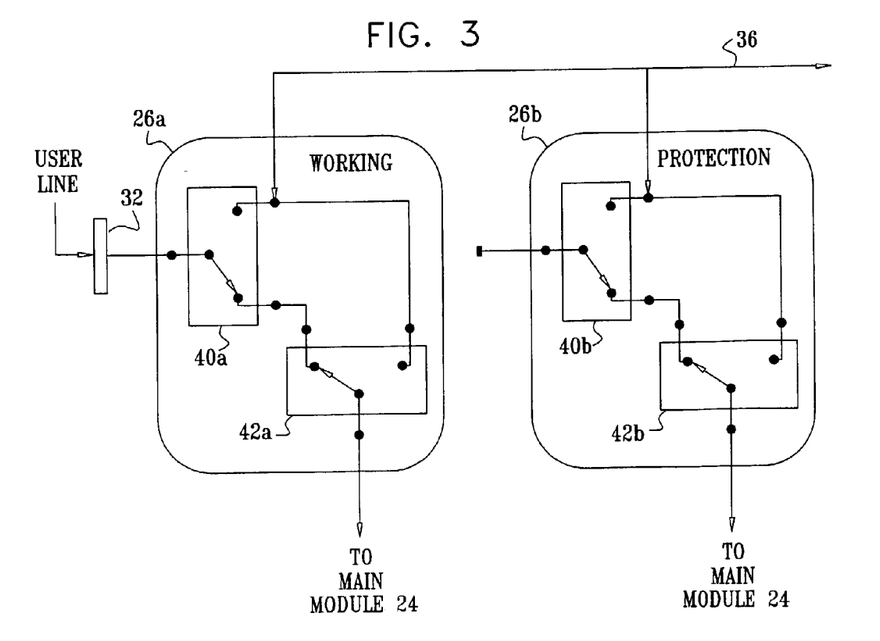
FIG. 3 is a block diagram that schematically illustrates a 1:1 pair of interface cards in a normal working configuration, in accordance with a preferred embodiment of the present invention.

FIG. 3 is a block diagram that schematically illustrates spoke line cards 26a and 26b in a 1:1 protection configuration, during normal working operation. Card 26a could be line card LC1, as shown in FIG. 1, which card 26b is LC2. The same type of line card may be used for both the working card 26a and the standby protection card 26b. (Lower-case suffixes in reference numbers, such as the suffixes "a" and "b," are used here simply to indicate different cards and components of the same types. Alternatively, cards 26a and 26b could represent any one of the other 1:1 pairs noted above.) Input switch 40a of working card 26a is connected to connector 32, while input switch 40b of the protection card is unconnected. As long as working card 26a is functioning properly, all signals between the user line and main module 24 are processed by card 26a, with switches 40a and 42a held in the configuration shown in FIG. 3.

Figure 4:
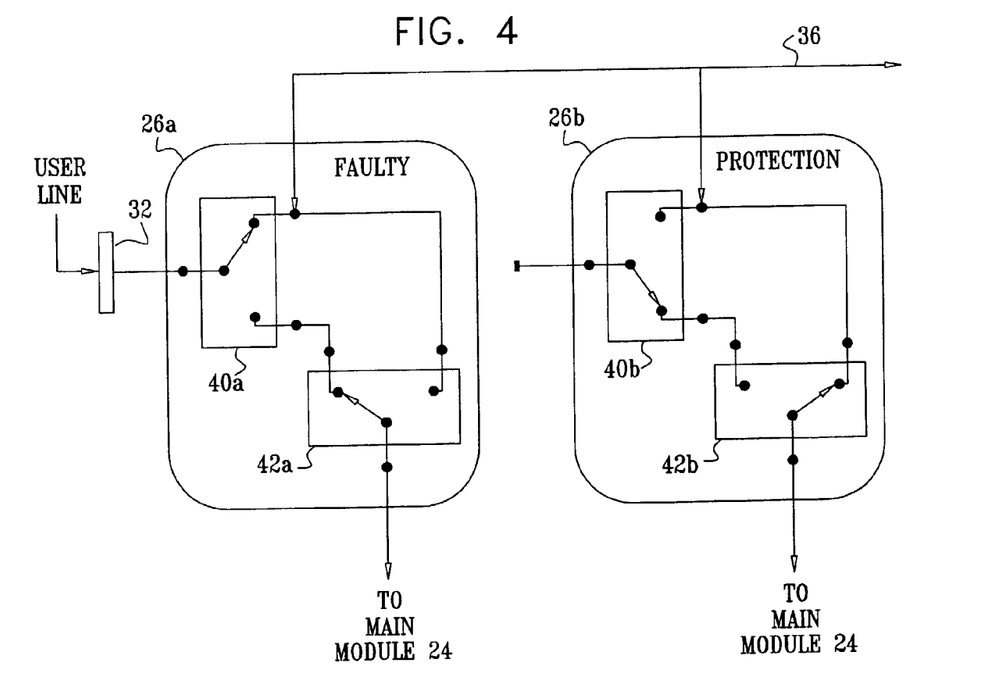
FIG. 4 is a block diagram that schematically illustrates the pair of interface cards of FIG. 3 in a protection configuration.

FIG. 4 is a block diagram that schematically illustrates protection operation of spoke line cards 26a and 26b. Here it is assumed that a fault has been detected in working card 26a or in a trace 30 that connects the working card to main module 24. As a result, input switch 40a is toggled to connect the user line at connector 32 to protection bus 36. At the same time, output switch 42b of protection card 26b is toggled to capture the incoming signals from the protection bus. These signals are now processed by the protection card and conveyed via traces 30 to the main module. Outgoing signals are processed and switched in like manner.

Figure 5:
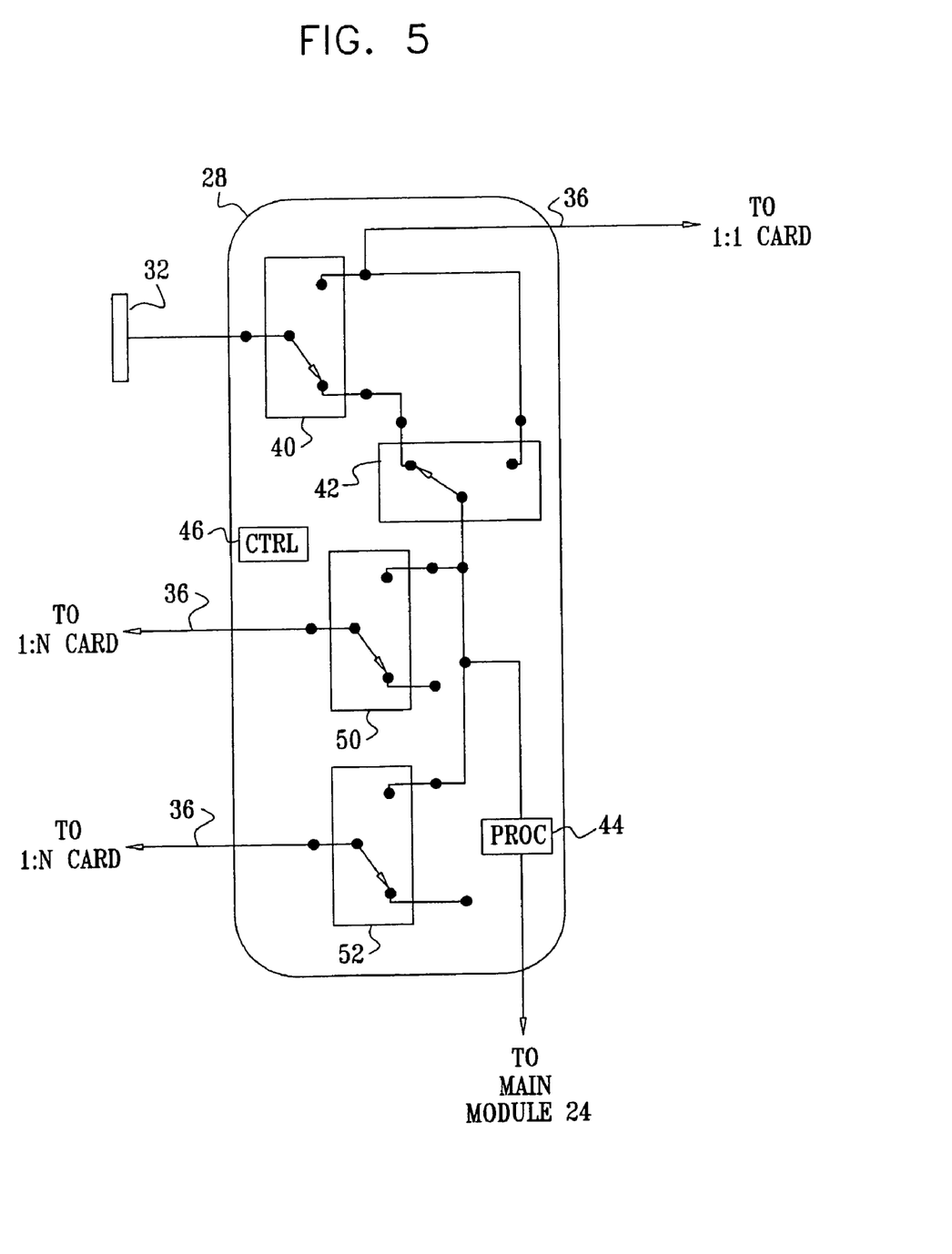
FIG. 5 is a block diagram that schematically illustrates a central interface card for use in the equipment of FIG. 1, in accordance with a preferred embodiment of the present invention.

FIG. 5 is a block diagram that schematically illustrates central line card 28, in accordance with a preferred embodiment of the present invention. A respective spoke of protection bus 36 connects central line card 28 to each pair of spoke cards 26, as shown in FIG. 1. For each spoke that is connected to it, the central line card has a respective input switch 50, 52, which is used to select the spoke for which protection is required. In the switch configuration shown in FIG. 5, all the spoke line cards are assumed to be working normally, so that switches 50 and 52 are in their unconnected positions. Since each input switch 50, 52 serves two spoke line cards, the number of switches needed on central line card 28 is substantially smaller than the number that would be required to implement a full-star topology. The central line card also comprises signal processing circuitry 44 and an embedded controller 46, as described above.

A further spoke of protection bus 36 connects to the single spoke card (LC3 in FIG. 1) for which central card 28 provides both 1:1 and 1:N protection. In the embodiment shown here, the central card also has an optional connector 32 and input and output switches 40 and 42, like the spoke cards. These elements enable the central card to operate as a spoke card if desired, in addition to or alternatively to its central protection function. Alternatively, if the central card is to serve only for protection purposes, connector 32 and input switch 40 may be eliminated. Further alternatively, if the central card is to provide only 1:N protection (as for example, when there is an odd number of line cards on the protection bus), each spoke of the protection bus may have two spoke line cards attached to it.

Figure 6:
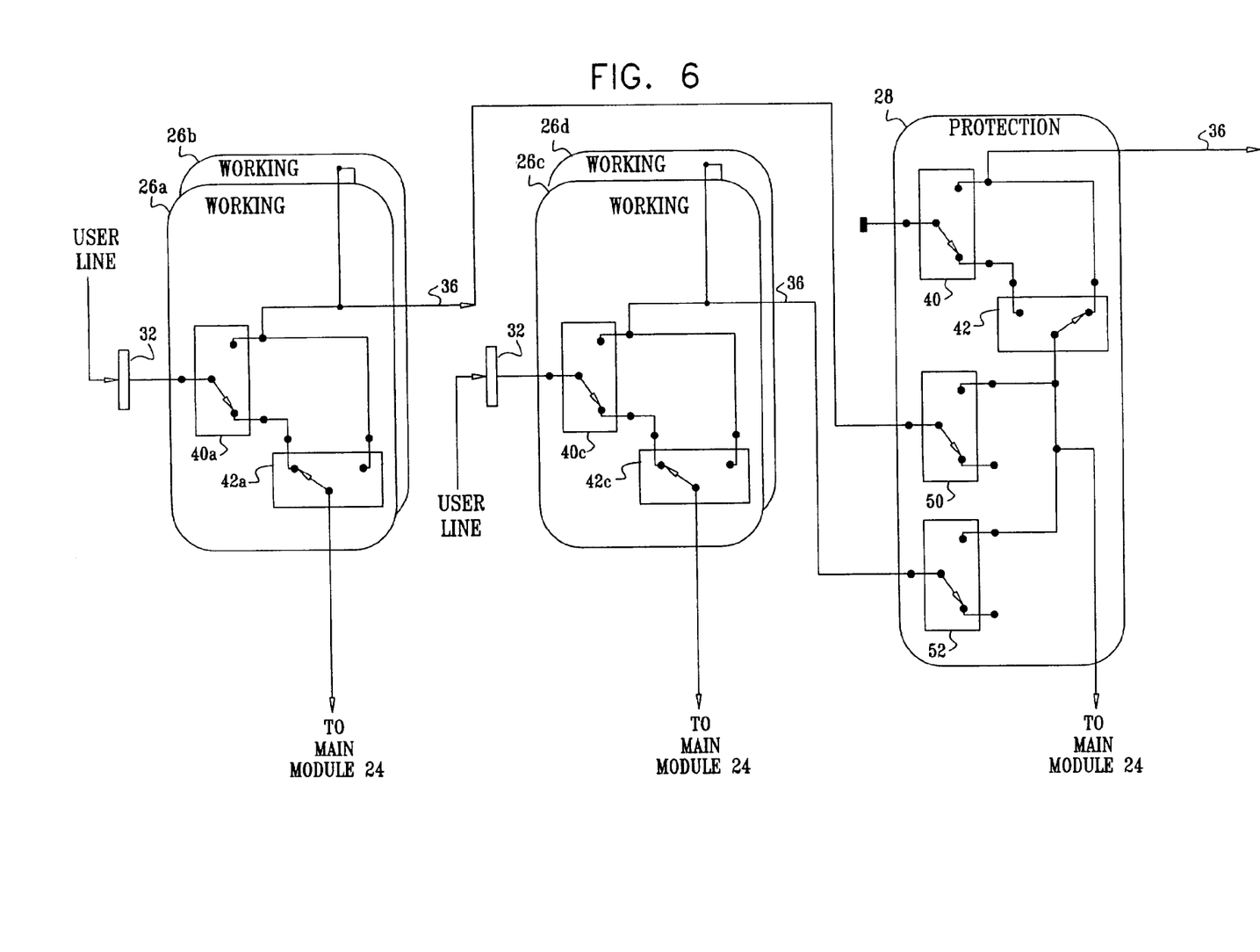
FIG. 6 is a block diagram that schematically illustrates a number of interface cards together with the central interface card of FIG. 5 in a 1:N working configuration, in accordance with a preferred embodiment of the present invention.

FIG. 6 is a block diagram that schematically illustrates central line card 28 and spoke line cards 26a–26d in a 1:N protection configuration, during normal working operation. Cards 26a and 26b are connected together to one of the spokes, while cards 26c and 26d are connected to another, in the manner shown in FIG. 1. Input switches 40a and 40c and output switches 42a and 42c (and likewise the switches on cards 26b and 26d, which are not shown) are configured so that each of the spoke cards processes the incoming signals from and outgoing signals to its own user line. The same traces of protection bus 36 that were used to connect the 1:1 pairs, such as cards 26a and 26b, in the 1:1 protection configuration of FIGS. 3 and 4 serve as the spokes connecting the spoke line cards to central line card 28 in the 1:N configuration of FIG. 6. As long as all the spoke line cards are working properly, central line card 28 remains on standby.

Figure 7:
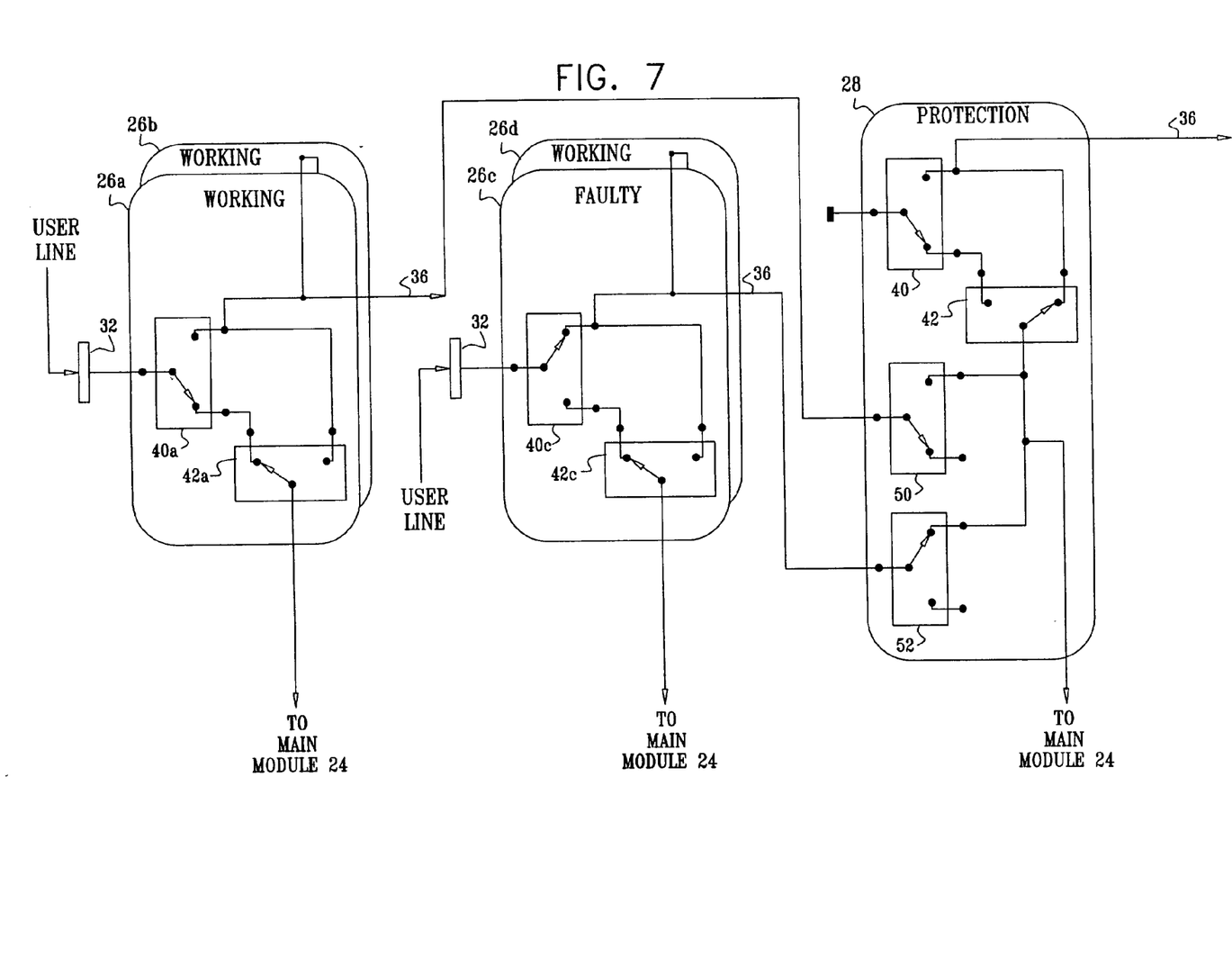
FIG. 7 is a block diagram that schematically illustrates the interface cards of FIG. 6 in a protection configuration.

FIG. 7 is a block diagram that schematically illustrates protection operation of central line card 28. A fault is assumed to have occurred in spoke line card 26c, as shown in the figure. Input switch 40c is therefore toggled to convey signals via protection bus 36 to central line card 28. Input switch 52 of the central line card is similarly toggled to receive and process the signals, in place of the faulty spoke line card. The remaining spoke line cards continue working normally. Of course, if two line cards fail simultaneously, central line card 28 will be able to protect only one of them, but this is an inherent feature of 1:N protection schemes.

Although the preferred embodiments described hereinabove are directed to backplane-based access equipment 20, the partial-star protection architecture may similarly be used in other types of communication platforms, used both for access and core network functions. Furthermore, while protection bus 36 used in equipment 20 is configurable for 1:1 and 1:N protection, the partial star architecture may alternatively be used in other flexible protection schemes. For example, some or all of the spokes in the partial star may have M+1 interface cards connected thereto (M>1). The interface cards on such spokes will then be configurable for either 1:N or 1:M protection. Alternative protection topologies based on the principles of the present invention will be apparent to those skilled in the art.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
    a plurality of interface cards, including a central interface card and spoke interface cards, which are adapted to link communication lines to a network; and
    a protection bus comprising multiple spoke connections that link the central interface card to the spoke interface cards in a partial star configuration, such that on at least one of the spoke connections there are two of the spoke interface cards connected together to the central interface card,
    wherein no more than a single one of the spoke connections has only one of the spoke interface cards connected thereto, while the remaining spoke connections have respective pairs of the spoke interface cards connected thereto.

2. Apparatus according to claim 1, wherein each of the pairs of the spoke interface cards comprises a working card and a protection card, which are adapted to operate in a 1:1 protection configuration.

3. Apparatus according to claim 2, wherein the working card comprises a connection interface, which is connected to receive and transmit signals over one of the communication lines, and an input switch, which is operable so as to transfer the signals via one of the spoke connections to the protection card when a fault occurs in the working card.

4. Apparatus according to claim 3, wherein both the working card and the protection card comprise processing circuitry, for processing the signals, and wherein the protection card comprises an output switch, which is operable so as to receive the signals from the one of the spoke connections when the fault occurs in the working card and to convey the signals to the processing circuitry of the protection card for processing thereby.

5. Apparatus according to claim 2, wherein the central interface card is adapted to operate in the 1:1 protection configuration in conjunction with the one of the spoke interface cards that is connected to the single one of the spoke connections having only the one of the spoke interface cards connected thereto.

6. Apparatus according to claim 1, wherein the spoke interface cards are adapted to serve as working cards, comprising respective connection interfaces, which are connected to receive and transmit signals over the communication lines, and wherein the central interface card is adapted to serve as a protection card for the working cards in a 1:N protection configuration.

7. Apparatus according to claim 6, wherein each of the spoke interface card comprises an input switch, which is operable so as to transfer the signals via one of the spoke connections to the central interface card when a fault occurs in the spoke interface card.

8. Apparatus according to claim 7, wherein both the spoke interface card and the central interface card comprise processing circuitry, for processing the signals, and wherein for each one of the spoke connections, the central interface card comprises a respective output switch, which is operable so as to receive the signals from the one of the spoke connections when the fault occurs in the spoke interface card and to convey the signals to the processing circuitry of the central interface card for processing thereby.

9. Apparatus according to claim 6, wherein the interface cards comprise switches for selecting the 1:N protection configuration or a 1:1 protection configuration, in which each of the pairs of the spoke interface cards comprises a working card and a protection card.

10. A communication backplane, comprising:
    a backplane substrate;
    a plurality of receptacles fixed to the backplane substrate for receiving communication interface cards, the receptacles including a central receptacle and spoke receptacles; and
    printed circuit traces arranged on the backplane substrate to form a protection bus that comprises multiple spoke connections linking the central receptacle to the spoke receptacles in a partial star configuration, such that on at least one of the spoke connections there are two of the spoke receptacles connected together to the central receptacle,
    wherein no more than a single one of the spoke connections has only one of the spoke receptacles connected thereto, while the remaining spoke connections have respective pairs of the spoke receptacles connected thereto.

11. A method for fault protection in communication equipment, comprising:
    arranging a plurality of interface cards, including a central interface card and spoke interface cards, to link communication lines to a network;
    interconnecting the interface cards with a protection bus comprising multiple spoke connections that link the central interface card to the spoke interface cards in a partial star configuration, such that on at least one of the spoke connections there are two of the spoke interface cards connected together to the central interface card;
    determining that a fault has occurred in a first one of the interface cards serving a first one of the communication lines; and
    responsive to the fault, conveying signals over the protection bus from the first one of the interface cards to a second one of the interface cards, so that the second one of the interface cards serves the first one of the communication lines in place of the first one of the interface cards,
    wherein interconnecting the interface cards comprises making the spoke connections so that no more than a single one of the spoke connections has only one of the spoke interface cards connected thereto, while the remaining spoke connections have respective pairs of the spoke interface cards connected thereto.

12. A method according to claim 11, wherein making the spoke connections comprises connecting each of the pairs of the spoke interface cards to operate as a working card and a protection card in a 1:1 protection configuration.

13. A method according to claim 12, wherein arranging the plurality of interface cards comprises connecting the working card via a connection interface to receive and transmit signals over one of the communication lines, and wherein conveying the signals over the protection bus comprises transferring the signals from the connection interface via one of the spoke connections to the protection card responsive to the fault in the working card.

14. A method according to claim 12, wherein making the spoke connections comprises configuring the central interface card to operate in the 1:1 protection configuration in conjunction with the one of the spoke interface cards that is connected to the single one of the spoke connections having only the one of the spoke interface cards connected thereto.

15. A method according to claim 11, wherein arranging the plurality of interface cards comprises connecting the spoke interface cards to serve as working cards, which receive and transmit signals over the communication lines via respective connection interfaces, and wherein interconnecting the interface cards comprises connecting the central interface card to serve as a protection card for the working cards in a 1:N protection configuration.

16. A method according to claim 15, wherein conveying the signals over the protection bus comprises transferring the signals via one of the spoke connections to the central interface card responsive to the fault in one of the spoke interface cards.

17. A method according to claim 15, and comprising switching between the 1:N protection configuration and a 1:1 protection configuration, in which each of the pairs of the spoke interface cards comprises a working card and a protection card.

* * * * *